United States Patent [19]

Allnutt

[11] Patent Number: 4,570,967
[45] Date of Patent: Feb. 18, 1986

[54] EXTENDIBLE TRAILER SYSTEM

[76] Inventor: Fred Allnutt, 10370 Baltimore-National Pike, Ellicott City, Md. 21043

[21] Appl. No.: 555,146

[22] Filed: Nov. 25, 1983

[51] Int. Cl.⁴ .............................................. B62D 21/14
[52] U.S. Cl. ................................... 280/656; 280/789; 296/204
[58] Field of Search ............... 280/656, 785, 789, 797, 280/142, 401; 180/209; 296/26, 204; 403/254, 374, 316, 317

[56] References Cited

U.S. PATENT DOCUMENTS

| | | | |
|---|---|---|---|
| 2,119,800 | 6/1938 | Tull | 280/789 |
| 2,491,044 | 12/1949 | Holland | 280/656 |
| 2,796,266 | 6/1957 | Sells | 280/656 |
| 3,612,562 | 10/1971 | Sweda | 280/656 |
| 3,838,868 | 10/1974 | Robertson | 280/656 |
| 3,885,691 | 5/1975 | Knapp | 280/656 |
| 3,913,933 | 10/1975 | Visser et al. | 280/656 |
| 4,119,224 | 10/1978 | Moody | 280/656 |
| 4,358,133 | 11/1982 | Stucky | 280/656 |
| 4,412,699 | 11/1983 | Peruzzi | 280/656 |

FOREIGN PATENT DOCUMENTS 49697 5/1939 France ............................ 280/785

*Primary Examiner*—John A. Pekar
*Assistant Examiner*—Mark C. Dukes
*Attorney, Agent, or Firm*—Morton J. Rosenberg

[57] ABSTRACT

An extendible trailer system (10) which is adapted to be coupled to the cab of a vehicle and is reversibly extendible in both the longitudinal direction (14) as well as the transverse direction (16). The extendible trailer system (10) includes a first trailer frame (18) having an extended length in longitudinal direction (14). System (10) further includes a second trailer frame (18) which is extended in longitudinal direction (14). Releasable coupling mechanism (36) allows coupling of second trailer frame (20) to the first trailer frame (18) and allows for the second trailer frame (20) to be at least partially and slidably inserted into coupling relation with the first trailer frame (18). A transverse extension mechanism (84) is provided on both the first trailer frame (18) and the second trailer frame (20) to allow for a reversible extension and retraction of the overall width of extendible trailer system (10) in transverse direction (16).

17 Claims, 9 Drawing Figures

EXTENDIBLE TRAILER SYSTEM

BACKGROUND OF THE INVENTION

1. Field of the Invention

This invention is directed to a vehicle system. In particular, this invention is directed to a trailer system adapted to be coupled to the cab of a vehicle to allow extension in both a longitudinal direction, as well as a transverse direction. Still further, this invention relates to an extendible trailer system having a releasable coupling mechanism between a primary or first trailer frame and a secondary or second trailer frame each coupled to the other. More in particular, this invention directs itself to a coupling mechanism for releasably coupling the first trailer frame and the second trailer frame in a secure and easily releasable manner. Additionally, this invention directs itself to an extendible trailer system having a first trailer frame and a second trailer frame which may be released each from the other subsequent to delivery of a particular structure load and the mounting of the second trailer frame on the first trailer frame for the return of the vehicle to a destination area.

2. Prior Art

Extendible trailer systems have been known in the art. The best prior art known to the Applicant includes U.S. Pat. Nos. 2,796,266; 3,239,274; 2,119,800; 3,587,890; 2,717,802; 2,407,092; 1,248,037; 2,962,295; 3,087,741; and, 2,741,489.

In some prior art extendible frames such as that shown in U.S. Pat. No. 2,796,266, side members are telescopically received within longitudinally extending members. Fastening bolts are engaged through apertures in cooperating members to secure sections in a constrained manner. Such types of prior art systems provide for a time consuming locking procedure and further do not provide for a dual type extension of the dimensions of the overall trailer system.

In some prior art systems such as that shown in U.S. Pat. No. 3,587,890, there are provided transversely displaced brackets. Wings are fitted over the brackets and the wings are secured to associated brackets by means of bolts. Opening channel members are provided which are dimensioned to receive bottom portions of a house section base frame. However, the brackets and wing members are not transversely displaceable or adjustable with respect to the frame.

Other prior art systems which provide for extension of trailer type sections of a vehicle provide for complicated locking procedures which generally are time consuming in the coupling phase of the locking operation, and increase the labor costs of providing such extendible vehicles.

SUMMARY OF THE INVENTION

An extendible trailer system adapted to be coupled to the cab of a vehicle. The extendible trailer system includes a longitudinally extended first trailer frame and a longitudinally extended second trailer frame. The second trailer frame is adapted to be coupled to the first trailer frame. A coupling mechanism is provided for coupling the second trailer frame to the first trailer frame. The second trailer frame is at least partially slidably inserted into coupling relation with the first trailer frame.

DESCRIPTION OF THE PREFERRED EMBODIMENTS

Figure 1:
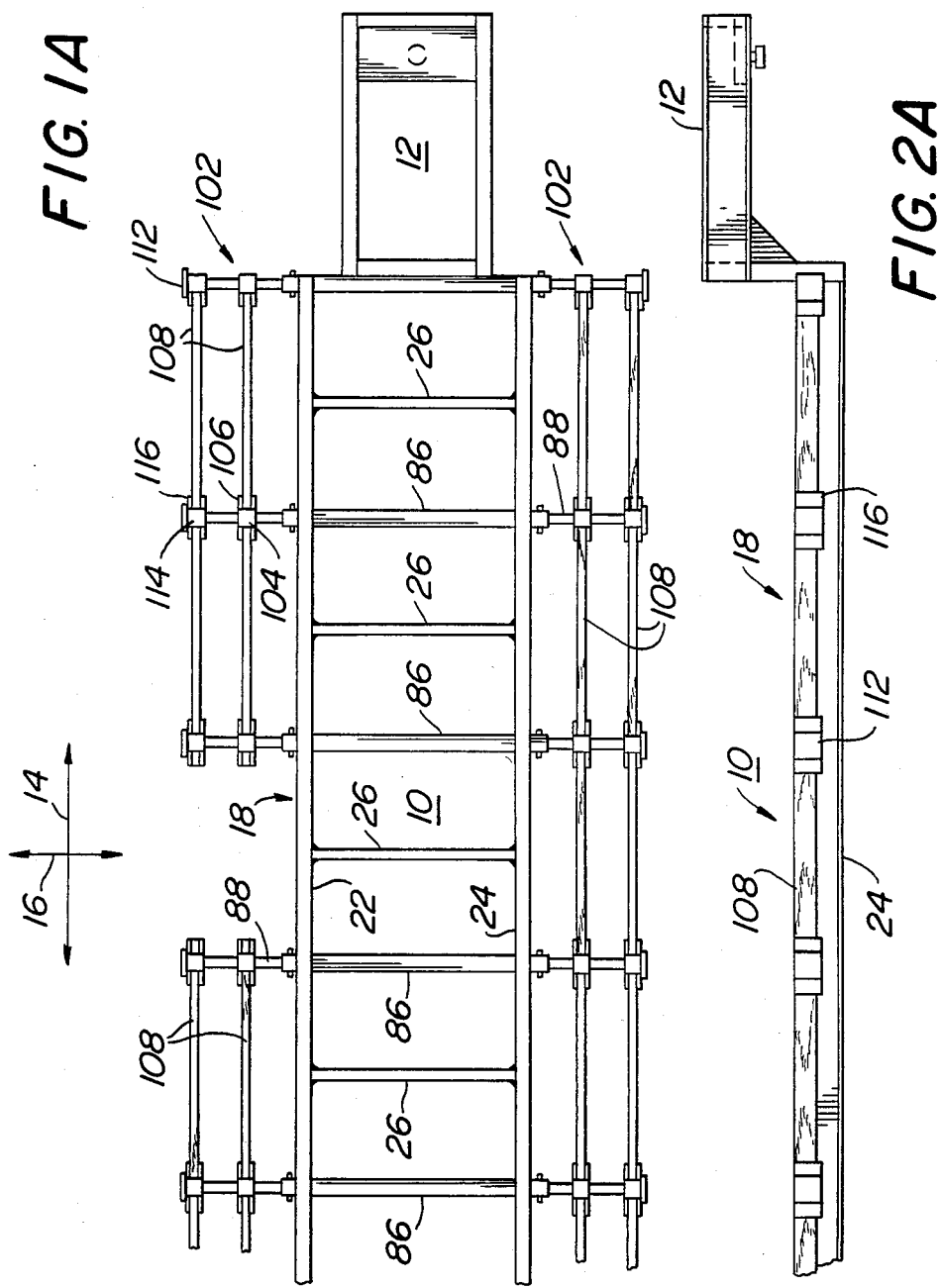
FIG. 1A is a top view, partially cut-away of the first trailer frame section.
FIG. 1B is a top view of the second trailer frame.
Figure 2:
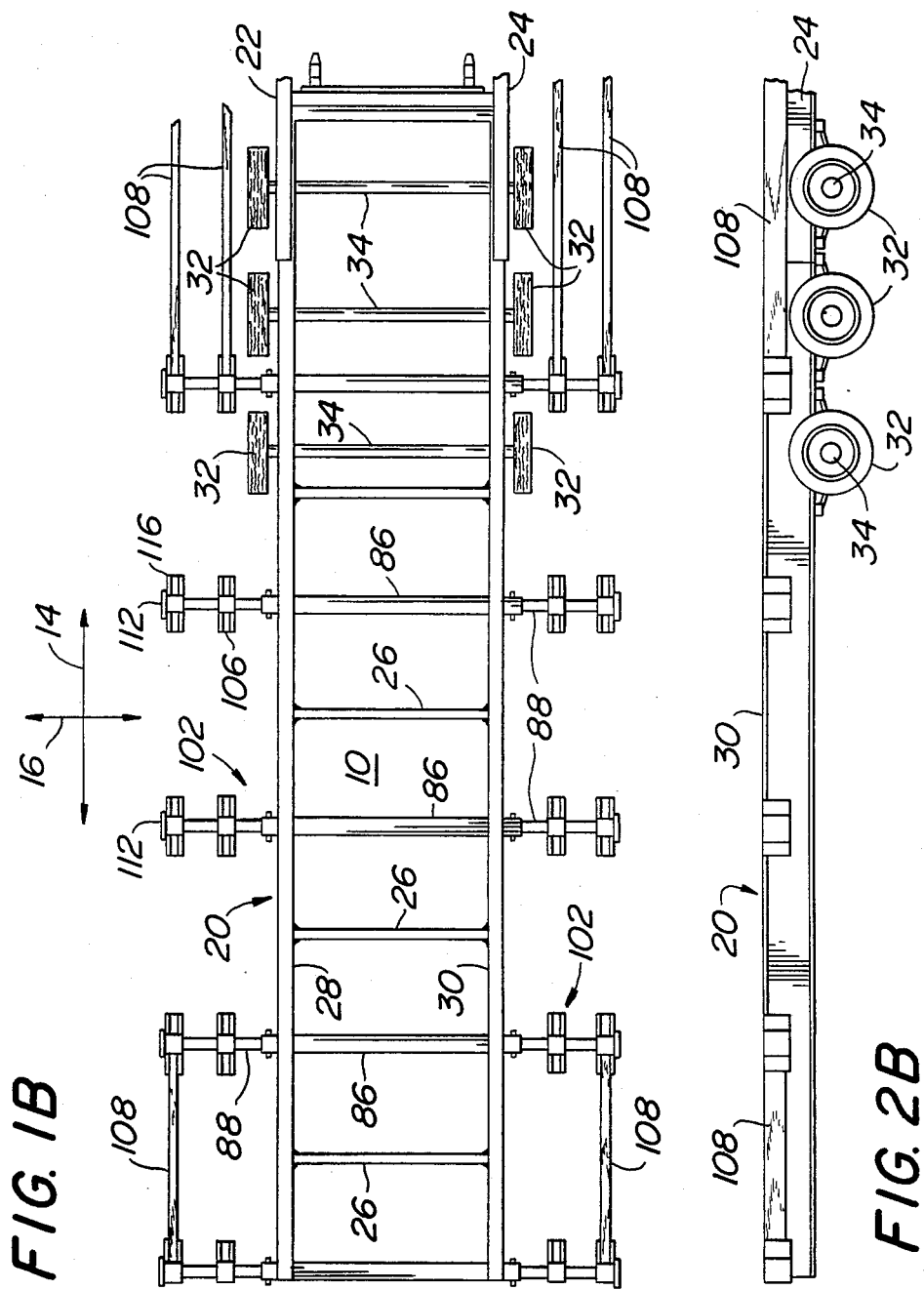
FIG. 2A is a side view partially cut-away of the first trailer frame section.
FIG. 2B is a side view partially cut-away of the second trailer frame section.

Referring now to FIGS. 1A, 1B, 2A, and 2B, there is shown extendible trailer system 10 adapted to be coupled to the cab of a vehicle through a standard type hitch 12, as is shown in FIG. 1A and 2A. In overall concept, extendible trailer system 10 is particularly designed to provide at least two trailer sections which may be coupled each to the other in order to extend the trailer bed section carrying a load in longitudinal direction 14. Additionally, as will be shown in following paragraphs, extendible trailer system 10 allows for adjustability of the trailer bed section in transverse direction 16 to accomodate a wide variety of load dimensions.

In particular, extendible trailer system 10 may be used for transport of large dimensioned loads such as houses and other structures. In this type of use, extendible trailer system 10 may have longitudinally extended first trailer frame 18 coupled to longitudinally extended second trailer frame 20 in a manner to be fully described in following paragraphs, in order to provide an extended length of extendible trailer system 10 in longitudinal direction 14. The load structure (not shown) is then loaded on first and second trailer frames 18 and 20 and transported to a remote site. Once the load structure is removed from extendible trailer system 10, second trailer frame 20 may be mounted on top of first trailer frame 18 and the vehicle may be then driven back to the point of origin.

The advantages of providing a modular type extendible trailer system 10 wherein second trailer frame 20 may be mounted on first trailer frame 18 for return to an origin of site is clearly seen in the driving safety factor associated therewith. Where second trailer frame 20 is mounted on first trailer frame 18, the vehicle operator is transporting a vehicle having a dimension much less in longitudinal direction 14 than would be had if first and second trailer frames 18 and 20 were coupled together. This uncoupling and mounting of frames 18 and 20 increases the control of the vehicle operation by the driver. Additionally, economic advantages are clearly seen in that tax rates are sometimes calculated by the extended length of trailer system 10 and a minimization of system 10 dimensions reduces the tax rates paid by the vehicle operators.

Extendible trailer system 10 includes longitudinally extended first trailer frame 18. Frame 18 includes at least a pair of transversely displaced longitudinally extending channel members 22 and 24, as is clearly seen in FIGS. 1A, 3, and 6. First frame channel member 22 and 24 may be I-beam type members, or U-shaped members adapted for insertion of sections of second trailer frame 20, as will be described in following paragraphs. Transverse displacement of first and second channel members 22 and 24 is provided in constrained and fixed relation by various structural members associated therewith, such as cross beams 26 welded on opposing ends and not important to the inventive concept, as is herein described.

Figure 3:
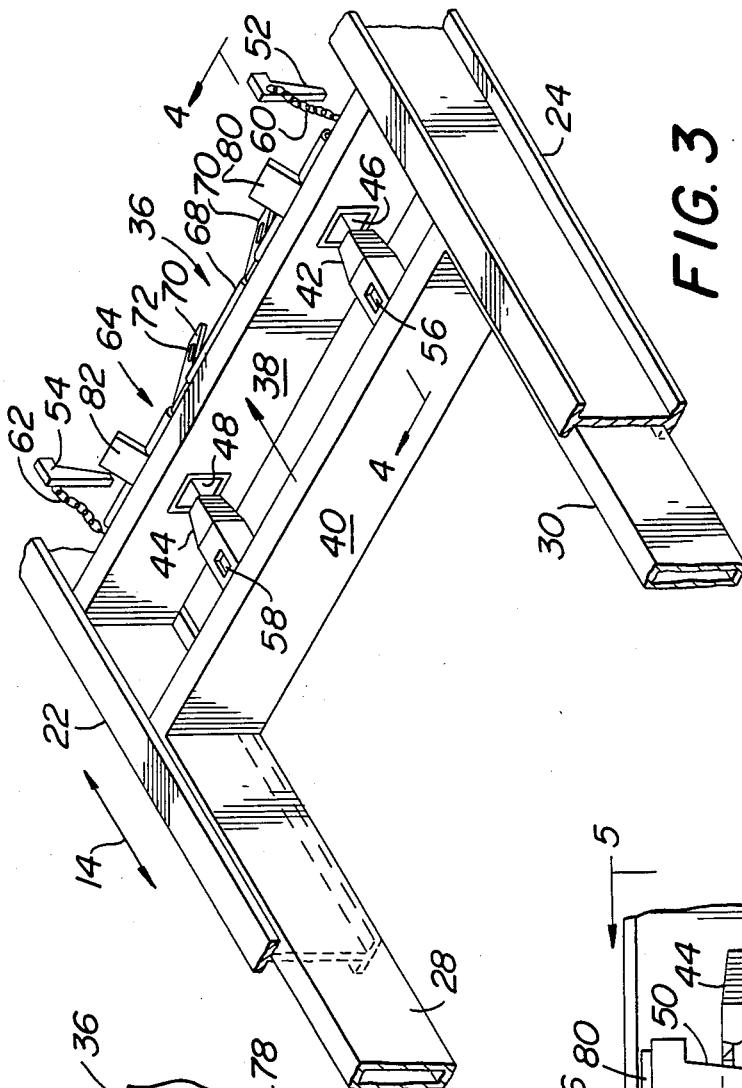
FIG. 3 is a perspective view of a coupling mechanism.

Trailer system 10 further includes longitudinally extended second trailer frame 20 which is adapted to be coupled to first trailer frame 18. Second trailer frame 20 includes at least a pair of transversely displaced longitudinally extended beam members 28 and 30. Second frame beam members 28 and 30 are adapted to be matingly engageable with first trailer frame channel members 22 and 24, as is clearly seen in FIG. 3. Second frame beam members 28 and 30 may have a substantially rectangular contour, however, such is not important to the inventive concept as herein described, with the exception that the transverse width of second trailer frame 20 permit insertion and mating engagement of second frame beam members 28 and 30 with first frame channel members 22 and 24, as is shown in FIG. 3. Additionally, second trailer frame 20 includes a plurality of cross-beams 26 as was described for first trailer frame 18, to provide for structural integrity and for maintenance of second frame beam members 28 and 30 in a fixed transverse displacement, each with respect to the other.

As is seen in FIG. 1B and 2B, second trailer frame 20 includes standard wheels 34 mounted on transversely directed axles 34 to permit rolling interface with a base surface. Although not shown, first trailer frame 18 similarly has standard type wheel members 32, as is well-known in the art.

Figure 5:
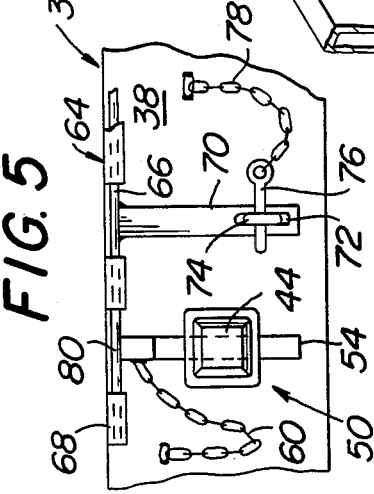
FIG. 5 is a sectional view partially in cut-away taken along the Section line 5—5 of FIG. 4.
Figure 4:
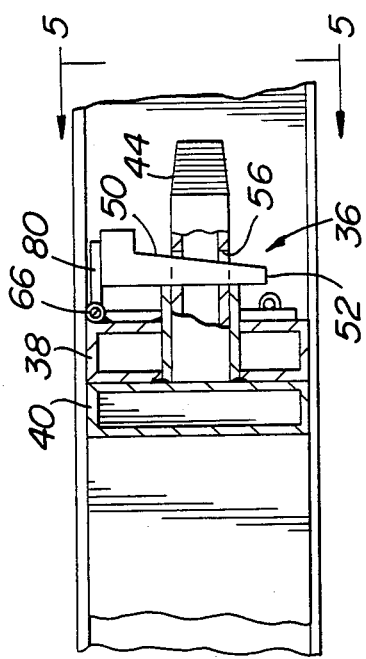
FIG. 4 is a sectional view of the coupling mechanism taken along the Section line 4—4 of FIG. 3.

Referring now to FIGS. 3, 4 and 5, there is shown releaseable coupling mechanism 36 for coupling second trailer frame 20 to first trailer frame 18. As is seen in FIG. 3, second trailer frame 20 is at least partially slideably insertable into coupling relation with first trailer frame 18 through interface of opposing second frame beam members 28 and 30 within first frame channel members 22 and 24 in longitudinal direction 14.

Referring to FIGS. 3, 4 and 5, releaseable coupling mechanism 36 includes transversely directed rear beam member 38 which is rigidly secured on opposing transverse ends to transversely displace longitudinally extending channels 22 and 24 of first trailer frame 18. Rear beam 38 may be secured to opposing first frame channel members 22 and 24 through welding, bolting, or some like technique, not important to the inventive concept as is herein described, with the exception that the coupling be rigid in nature and sufficient to support the loads applied. Transversely directed frontal beam member 40 is rigidly secured to transversely displaced longitudinally extending beam members 28 and 30 of second trailer frame 20. As can be seen in FIG. 3, the transverse displacement of second frame beam members 28 and 30 is of predetermined width in order that beam members 28 and 30 are slidably insertable within the channels formed on the inner sections of first frame channel members 22 and 24.

Transversely directed frontal beam member 40 has longitudinally directed pin members 42 and 44 rigidly secured to a frontal face thereof. Pin members 42 and 44 extend in longitudinal direction 14, as is clearly seen in FIG. 3. Pin members 42 and 44 are contoured for insertion within through openings 46 and 48 formed in transversely directed rear beam member 40 of first trailer frame 18. In this manner, frontal beam member 40 is cooperatively inserted within transversely directed rear beam member 38 for releasable insertion of second trailer frame 20 into first trailer frame 18.

Releaseable coupling mechanism 36 further includes insert coupling mechanism 50 shown in FIGS. 4 and 5 for releasably securing transversely directed rear beam member 38 of first trailer frame 18 to frontal beam member 40 of second trailer frame 20. Insert coupling mechanism 50 includes insert members 52 and 54 which are insertable into vertically directed through openings 56 and 58, formed in longitudinally extending pin members 42 and 44. As can be seen in FIGS. 3 and 4, insert members 52 and 54 may be wedge-shaped in contour in order for ease of insertion through openings 56 and 58. Thus, by insert of insert members 52 and 54 into through openings 56 and 58, second trailer frame 20 is effectively coupled to first trailer frame 18. When insert members 52 and 54 are positionally located as shown in FIG. 4, transversely directed frontal beam member 40 is coupled to transversely directed rear beam member 38 and first and second trailer frames 18 and 20 are in releaseable securement each to the other.

Insert members 52 and 54 are fixedly secured to transversely directed rear beam member 38 of first trailer frame 18. As can be seen, insert members 52 and 54 may be secured on one end thereof to chain members 60 and 62 having opposing ends secured to transversely directed rear beam member 38 and a respective insert member 52 or 54. Chain members 60 and 62 may be standard steel chain members formed of interlocking links, as is shown and not important to the inventive concept as herein described, with the exception that chain members 60 and 62 be formed of a material sufficient to provide structural integrity responsive to the loads applied.

Releaseable coupling mechanism 36 further includes hasp mechanism 64 used for maintaining insert coupling mechanism 50 in secured relation to transversely directed rear beam member 38 and transversely directed frontal beam member 40.

Hasp mechanism 64 as shown in FIGS. 3 and 5, includes transversely extended hasp rod member 66 which is rotatable about an axis coincident with transverse direction 16. Hasp rod member 66 is captured by hasp sleeve member 68 which is mounted to a frontal surface of rear beam member 38. Hasp sleeve member 68 may be rigidly secured to rear beam member 38 by welding, securement, or some like technique. In this manner, hasp rod member 66 is captured by, but rotatively displaceable with respect to hasp sleeve member 68.

Hasp mechanism 64 is seen to include first hasp strap member 70 which is fixedly secured to hasp rod member 66 and radially extending outwardly therefrom. First strap member 70 may be welded to hasp rod member 66, or otherwise fixedly secured in constrained rotational displacement with respect thereto. Thus, as hasp rod member 66 is rotatively displaced about a transverse axis, first strap member 70 is similarly rotated. First strap member 70, as is seen in FIG. 5, includes strap opening 72 formed therethrough for insert over at least one staple member 74 secured in fixed relation to transversely directed rear beam member 38 of first trailer frame 20.

Staple pin member 76 is insertable within staple member 74 in order to capture first strap members 70 therebetween. Staple pin member 76 is secured to strap chain member 78, as is shown in FIG. 5. Strap chain member 78 is thus on opposing ends thereof fixedly secured to staple pin member 76 and a frontal surface of transversely directed rear beam member 38 of first trailer frame 18. First strap members 70 may be formed of steel, or some other rigid material composition sufficient to accept the loads imposed without denigration of structural integrity.

Second hasp strap members 80 and 82 shown in FIGS. 3-5, are rigidly secured to hasp rod member 66. Second hasp strap members 80 and 82 are transversely and radially displaced from first strap members 70 for covering insert coupling mechanism 50 when first hasp strap members 70 are inserted over staple members 74. Thus, as is seen in FIGS. 4 and 5, when hasp rod member 66 is rotatively displaced to a position where first strap members 70 are aligned in a vertical direction and matingly interface with a frontal surface of transversely directed rear beam member 38, second hasp strap members 80 and 82 are rotatively displaced to a horizontal position for interfacing with a top or upper surface of insert members 52 and 54.

Thus, when hasp mechanism 64 is displaced to a constrained position as shown in FIGS. 4 and 5, first strap members 70 are secured through insert of staple pin member 76 in staple members 74 to transversely directed rear beam member 38. Simultaneously, second hasp strap members 80 and 82 are displaced and rigidly coupled into a horizontal relation with respect to insert members 52 and 54 and maintains such members 52 and 54 within openings 56 and 58 of pin members 42 and 44. In this manner, insert members 52 and 54 are captured within pin members 42 and 44 and effectively couple first trailer frame 18 to second trailer frame 20.

Figure 6:
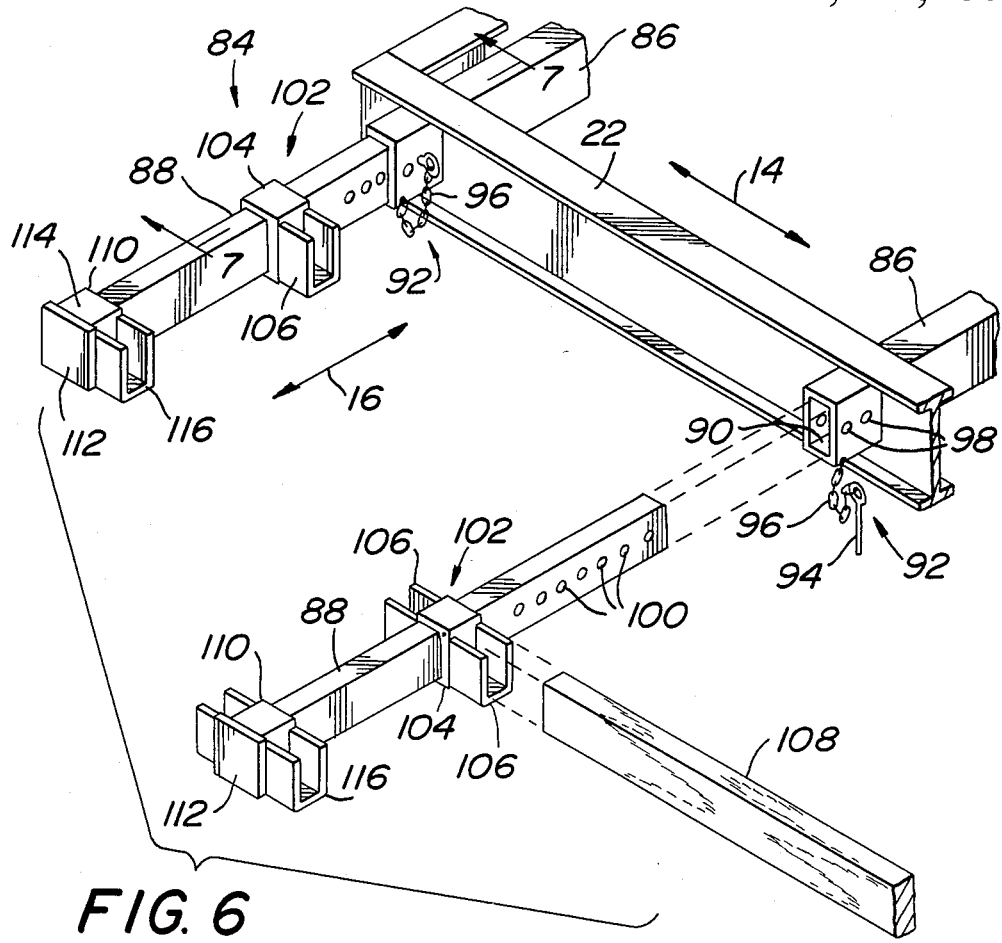
FIG. 6 is a perspective exploded view of the transverse extension mechanism; and, FIG. 7 is a sectional view taken along the Section line 7—7 of FIG. 6.
Figure 7:
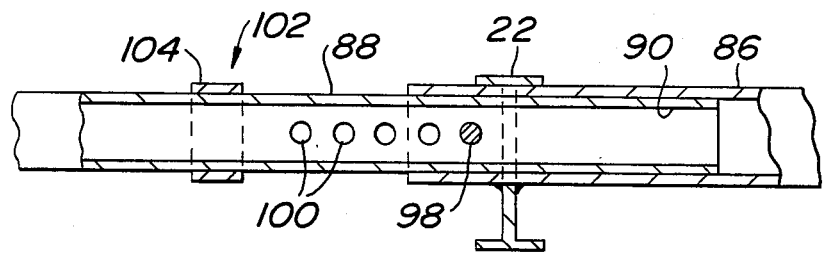

Extendible trailer system 10 includes reversible transverse extension mechanism 84 shown in FIGS. 6 and 7. As will be seen in following paragraphs, transverse extension mechanism 84 permits first and second trailer frame 18 and 19 to be extended or retracted in transverse direction 16 dependent upon the width or other dimensions of a load under consideration. Additionally, transverse extension mechanism 84 will be shown to include a load or support bearing system to further support and give additional load bearing capabilities to trailer system 10 when an additional load member is being carried.

Transverse extension mechanism 84 is seen to be coupled to longitudinally extending and transversely displaced channel members 22 and 24 of first trailer frame 18, as well as beam members 28 and 30 of second trailer frame 20.

Interspersed between cross-beam members 26 are a plurality of extension channel members 86 secured to opposing longitudinally directed channel members 22 and 24 on first trailer frame 18, as well as to second frame beam members 28 and 30 on second trailer frame 20. Extension channel members 86 may be closed contour members formed of steel or other like material composition having through opening 90 formed in each of extension channel members 86.

Transversely directed extension bar members 88 having a similar contour to extension channel through openings 90 formed in extension channel members 86 are telescopically received within extension channel members 86, as is clearly seen in FIGS. 6 and 7. Thus, extension bar members 88 may be displaced in transverse direction 16 in a reversible manner to provide an adjustable dimension to each of first and second trailer frames 18 and 20 responsive to the dimensions of a load being carried by extendible trailer system 10.

Extension member 84 further includes extension bar securing mechanism 92 for releasably securing extension bar member 88 to extension channel member 86 in a releasable, however fixed mounting. Extension securing mechanism 92 includes extension pin member 94 secured in flexible relation to extension channel member 86 by coupling to extension link chain member 96. Extension pin member 94 is adapted for insert through aligned through openings 98 and 100 passing through extension channel members 86 and extension bar members 88, respectively, as is seen in FIGS. 6 and 7. Thus, extension channel members 86 may be seen to be releasably coupled to extension bar members 88 by insert of extension pin members 94 within and through openings 98 and 100 which are in registration in longitudinal direction 14.

Transverse extension mechanism 84 further includes support mechanism 102 which is transversely displaceable and mounted to longitudinally displaced extension bar members 88, as is seen in FIG. 6. Transversely displaceable support mechanism 102 includes support collar member 104 which generally has a contour opening similar in contour to the external contour of extension bar members 88, however, such internal contour of support collar member 104 is slightly larger in dimension in order to allow reversible displacement in transverse direction 16. Thus, support collar member 104 is slidably mounted on extension bar members 88 for displacement in transverse direction 16.

Support collar member 104 has secured thereto at least one support channel or stabilizer member 106, as shown in FIG. 6. Support channel member 106 extends in longitudinal direction 14 and is generally U-shaped in contour. Each of support channel or stabilizer members 106 is rigidly secured to support collar members 104 through welding, bolting, or some like technique, not important to the inventive concept as herein described. Each of U-shaped support channel members 106 are adapted for the insert of longitudinally directed support beam members 108 which are insertable in transversely displaceable U-shaped channel members 106 through the open portion of the contour of support members 106. In general, the transverse displacement dimension of the legs of support channel members 106 may be seen to be slightly greater in transverse width than support beam members 108 in order to allow for insert, however, the width of the displaced legs of channel members 106 must be of a dimension such that beam members 108 are held in a relatively fixed manner therebetween.

Each of extension bar members 88 may include end support mechanisms 110 which are similar in description to support mechanisms 102, but are fixedly secured to an end portion or section of extension bar members 88. Each of end support mechanisms 110 may include an end support plate member 112 secured to an end collar member 114 and an end support channel or end stabilizer member 116, as is clearly shown in FIG. 6.

In this manner, there has been shown extendible trailer system 10 for a vehicle which includes primary trailer housing 18 extended in longitudinal direction 14, mounted in cooperative manner to secondary trailer housing 20 also extended in longitudinal direction 14. Transverse extension mechanism 84 has been shown and described for allowing reversible extension of both primary and secondary trailer housings 18 and 20 in transverse direction 16. Coupling mechanism 36 mounted in cooperative relation on both a rear section of primary trailer housing 18 and a frontal section of secondary trailer housing 20 is adapted for releasably coupling primary and secondary trailer housings 18 and 20. Insert coupling mechanism 36 is secured to primary trailer housing 18 for capturing coupling mechanism 36 in engaged relation to primary trailer housing 18. Thus, there has been shown an extendible trailer system 10 which may be extended in both longitudinal direction 14, as well as transverse direction 16 for accomodating loads of varying dimensions.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. An extendible trailer system adapted to be coupled to a cab of a vehicle comprising:
    (a) a longitudinally extended first trailer frame including at least a pair of transversely displaced longitudinally extending channel members;
    (b) a longitudinally extended second trailer frame adapted to be coupled to said first trailer frame, said second trailer frame including at least a pair of transversely displaced longitudinally extending beam members; and,
    (c) means for releasably coupling said second trailer frame to said first trailer frame, said second trailer frame being at least partially slidably inserted into coupling relation with said first trailer frame, said means for releasably coupling including a transversely directed rear beam member and a transversely directed frontal beam member rigidly secured to said pair of transversely displaced longitudinally extending channel and beam members of said first and second trailer frames respectively, said means for releasably coupling further including insert coupling means for releasably securing said rear beam member to said frontal beam member and hasp means for maintaining said insert coupling means in secured relation to said rear beam member and frontal beam member.

2. The extendible trailer system as recited in claim 1 where said transversely directed frontal beam member includes at least one longitudinally extending pin member insertable within a through opening formed in said transversely directed rear beam member of said first trailer frame.

3. The extendible trailer system as recited in claim 1 where said insert coupling means includes at least one insert member insertable through a vertically directed through opening formed in said longitudinally extending pin member.

4. The extendible trailer system as recited in claim 3 where said insert member is wedge-shaped in contour.

5. The extendible trailer system as recited in claim 3 where said insert member is fixedly secured to said transversely directed rear beam member of said first trailer frame.

6. The extendible trailer system as recited in claim 5 where said insert member is secured to a chain member having opposing ends secured to said rear beam member and said insert member.

7. The extendible trailer system as recited in claim 1 where said hasp means includes means for maintaining said insert coupling means in fixed relation to said rear beam of said first trailer frame.

8. The extendible trailer system as recited in claim 7 where said means for maintaining said insert coupling in fixed relation to said rear beam includes:
    (a) a transversely extended hasp rod member rotatable about a transverse axis;
    (b) a first hasp strap member rigidly secured to said hasp rod member and radially extending outward therefrom for insert over a staple member secured to said rear beam of said first trailer frame; and,
    (c) a second hasp strap member rigidly secured to said hasp rod member, said second hasp strap member being transversely and radially displaced from said first strap member for covering said insert coupling means when said first hasp strap member is inserted over said staple member.

9. The extendible trailer system as recited in claim 8 including reversible transverse extension means coupled to said longitudinally extending and transversely displaced channel members and beam members of said first and second trailer frames respectively.

10. The extendible trailer system as recited in claim 9 where said transverse extension means includes:
    (a) at least one transversely directed extension bar member;
    (b) at least one transversely directed extension channel member secured to opposing longitudinally directed channel members, said extension bar member being telescopically received within said extension channel member.

11. The extendible trailer system as recited in claim 10 including means for securing said extension bar member to said extension channel member.

12. The extendible trailer system as recited in claim 11 where said securement means includes an extension pin member secured to said extension channel member, said extension pin member for insert through at least a pair of aligned through openings formed through said extension channel member and said extension bar member.

13. The extendible trailer system as recited in claim 10 including transversely displaceable support means mounted to at least a pair of longitudinally displaced extension bar members.

14. The extendible trailer system as recited in claim 13 where said transversely displaceable support means includes:
    (a) at least a pair of transversely displaceable U-shaped channel frame members mounted on said pair of longitudinally displaced extension bar members; and,
    (b) a longitudinally directed support beam member insertable within said pair of transversely displaceable U-shaped channel frame members.

15. An extendible trailer system for a vehicle comprising:

(a) a primary trailer housing extended in a longitudinal direction;

(b) a secondary trailer housing extended in said longitudinal direction;

(c) transverse extension means for reversibly extending said primary and secondary trailer housings in a transverse direction, said transverse extension means including at least two tubular support members fixedly secured to said primary and secondary trailer housings and extending in a transverse direction and at least two outrigger extension bar members telescopically insertable in each of said tubular support members;

(d) coupling means mounted on a rear section of said primary trailer housing and a frontal section of said secondary trailer housing for releasably coupling said primary and secondary trailer housings;

(e) fastening means secured to said primary trailer housing for capturing said coupling means in engaged relation to said primary trailer housing; and, (f) support means for supporting a force loading on said transverse extension means, said support means being mounted on said transverse extension means and displaceable in said transverse direction, said support means including at least two stabilizer members contoured for receipt of a load bearing beam member therebetween, said stabilizer members being slidably mounted for transverse displacement on each of said outrigger extension bar members.

16. The extendible trailer system as recited in claim 15 including a pin support member insertable through a pair of registered openings formed in said tubular support members and said outrigger extension bar members.

17. The extendible trailer system as recited in claim 15 where at least two of said stabilizer members are secured in fixed relation to an end section of each of said outrigger extension bar members.

* * * * *